Patented Jan. 28, 1941

2,229,823

UNITED STATES PATENT OFFICE 2,229,823

SLUSH PUMP VALVE

Dudley C. Sharp, Houston, Tex.

Application August 8, 1936, Serial No. 94,884

4 Claims. (Cl. 251—127)

This invention relates to slush pump valves, and more particularly to the type employed in maintaining a circulation of drilling fluid in the rotary system of well drilling.

One object of the invention is to provide a valve assembly in which the wearing parts can readily be replaced.

A second object of the invention is to provide a valve assembly as above defined in which the design of the replaceable wearing parts is such as to render them inexpensive.

Other objects will appear from the following description when read in connection with the accompanying drawing in which.

Figure 1:
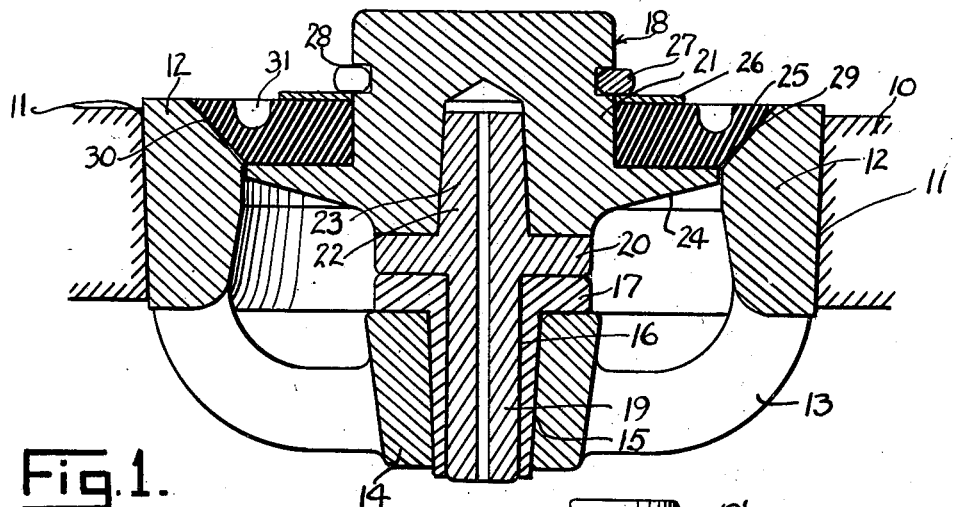
Fig. 1 is a vertical sectional view of a valve assembly embodying the present invention.

Referring to Fig. 1, the numeral 10 indicates a wall in the body of the pump. This wall is formed with a tapered seat 11 designed to receive a valve seat ring 12. The valve seat ring 12 is formed with a downwardly extending spider 13 connected with a centrally disposed hub 14. The hub 14 is formed with a tapered aperture 15 designed to receive a tapered bushing 16. The bushing 16 is constructed with a radial flange 17 designed to fit on the upper surface of the hub 14. It is of such design that it has a wedging fit in the aperture 15 of the hub 14.

Mounted for engagement with the ring 12 there is a valve 18, the stem 19 of which is extended downwardly and guided in the bushing 16. The stem 19 is constructed with a flange 20 which engages with the lower surface of a metallic member 21 forming the body of the valve, and which has above the flange 20 a tapered portion 22 which extends into and forms a wedging fit with a tapered recess 23 in the member 21. The member 21 is formed with an outwardly extending flange 24 upon which is mounted a rubber sealing member 25 designed for engagement with the ring 12. The rubber member 25 is held in place on the flange 24 by a washer 26, and a spring snap ring 27 designed to seat in an annular recess 28 in the outer periphery of the member 21.

The rubber sealing member 25 is formed with a tapered outer surface 29 which extends beyond the outer margin of the flange 24 and engages with a tapered surface 30 of less inclination on the ring 12; and is formed with an annular groove 31 on its upper face designed to increase the flexibility of the outer portion of the member.

When, in the operation of the valve, the valve member moves to closed position as shown in the drawing, the flange 20 upon the valve stem will engage with the flange 17 on the bushing 16, and the shock of closing will be taken up between the two surfaces of these flanges. When the valve is in this position the periphery of the flange 24 is small enough to pass the interior surface of the seat ring 12 so that no portion of the shock will be taken up at that point. As the valve assumes its closed position the taper on the outer surface of the packing ring or gasket 25 will contact first with the tapered seat 29 of the ring along its outer margin and the force of the liquid above the packing member will force it into sealing engagement with the valve seat along its entire outer margin.

It will be observed, therefore, that with my particular structure of valve and seat ring the wear caused by the closing of the valve will be taken up by the two removable members, that is the bushing 16 and the stem 19. As both of these members are removable and replaceable when worn the valve may be easily kept in repair.

Figure 2:
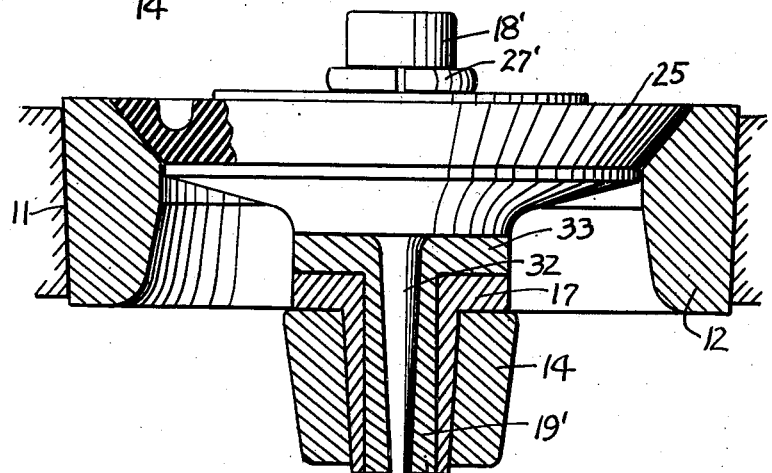
Fig. 2 is a view partly in section of a modified valve assembly.

In Fig. 2 I have shown a different embodiment of the invention. The seat ring 12 in this case is the same as in the Fig. 1 modification and the structure of the sealing member 25 is also the same. A difference occurs in the structure of the valve stem. In this form I provide an integral downwardly extending stem 32 which tapers gradually toward its lower point. Upon this stem I mount by a driving fit a sleeve or bushing 33 somewhat similar in general form to the bushing 17 upon the seat ring. It has a cylindrical downwardly extending portion 34 which fits about the stem 32 on its inner surface and on its outer surface it engages slidably within the opening through the bushing 17.

In this embodiment also the upper end of the valve body 18' is made of smaller circumference, the outer periphery being recessed to receive the locking ring 27'. In this embodiment the action of the valve member is the same as that previously described. The valve bushing 33 will be slidable within the ring bushing 17 and the wear and use will be taken up by these two members which, as will be obvious, are easily replaceable.

Figure 3:
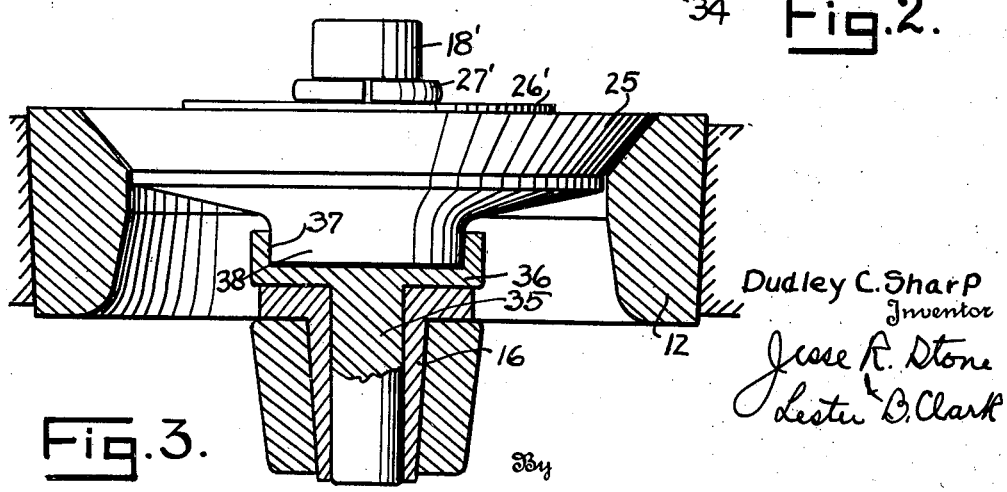
Fig. 3 is a view partly in section of a second embodiment of the invention.

In the Fig. 3 embodiment of the invention the valve stem 35 is formed with an upper head 36 having a recess 37 therein to receive the lower end 38 of the valve member. The fit of the member 38 in the socket 37 is a driving fit so that these two parts are held together in use, but their attachment is such that the stem may be removed from the valve head when wear upon the valve stem makes a substitution desirable.

In other respects the valve structure is the same as in the Fig. 2 embodiment.

In all these forms of the invention it will be seen that the wear which results from the operation of the valve is taken up on portions of the structure which may be removed and replaced. The bushing 16 is supported in the taper in the valve ring so that it remains stationary and little or no wear occurs on the top face of the spider 13 where the flange of the seat bushing contacts. The valve stem or wear member on the valve stem is also removable in each of the modifications but remains stationary so that the lower face of the valve with which the flange 20 contacts will not wear appreciably. The major portion of the wear occurs on the contact faces between the valve bushing and the seat bushing. By this structure it is possible to maintain the valve in operation for a relatively long period of time. It is possible to construct the removable wear taking members of relatively hard material which will withstand wear for a long period of time. The life of the valve is thus materially extended and the structure is an economical one, making it possible to operate the pump continuously for relatively long periods of time.

What is claimed is:

1. A slush pump valve assembly including a seat ring, a spider thereon having a central opening, said opening being tapered, a tapered bushing disposed in said opening and having a wedging fit therein, an outwardly extending flange on said bushing to seat on said spider, a valve arranged to seat on said ring and formed with a tapered recess, a stem for said valve extending into said bushing and constructed with a tapered portion which extends into and has a wedging fit in said recess, an outwardly extending flange on said stem to seat against said valve, and opposed surfaces on the aforesaid flanges constituting contact faces to absorb the shock of closing of said valve.

2. A slush pump valve assembly including a seat ring, a spider thereon having a central opening, said opening being tapered, a tapered bushing disposed in said opening and having a wedging fit therein, an outwardly extending flange on said bushing to seat on said spider, a valve arranged to seat on said ring, said valve comprising a metalic body formed with a tapered recess and a resilient sealing portion for contact with said ring, a stem for said valve extending into said bushing and constructed with a tapered portion which extends into and has a wedging fit in said recess, an outwardly extending flange on said stem to seat against said valve, and opposed surfaces on the aforesaid flanges constituting contact faces to absorb the shock of closing of said valve.

3. A slush pump valve assembly including a seat ring, a spider thereon having a central opening, a bushing removably mounted in the aforesaid opening, a flange on said bushing extending outwardly therefrom, a valve arranged to seat on said ring, said valve including a body formed with a lower axial recess, a stem for said valve removably mounted in the aforesaid recess and extending into said bushing, and a shoulder on said stem, the opposed surfaces on said shoulder and said bushing constituting contact faces to absorb the shock of closing of the valve.

4. A slush pump valve assembly including a seat ring, a spider thereon having a central opening, a bushing removably mounted in the aforesaid opening and extending outwardly from said spider, a valve arranged to seat on said ring, said valve comprising a metallic body having a lower axial recess and a resilient sealing portion on said body for contact with said ring, a stem for said valve removably mounted in the aforesaid recess and extending into said bushing, a shoulder on said stem, and opposed surfaces on said shoulder and said bushing constituting contact faces to absorb the shock of closing of the valve.

DUDLEY C. SHARP.